June 12, 1934. A. P. HARTZELL 1,962,561
SHOVEL HOLDER
Filed June 16, 1933
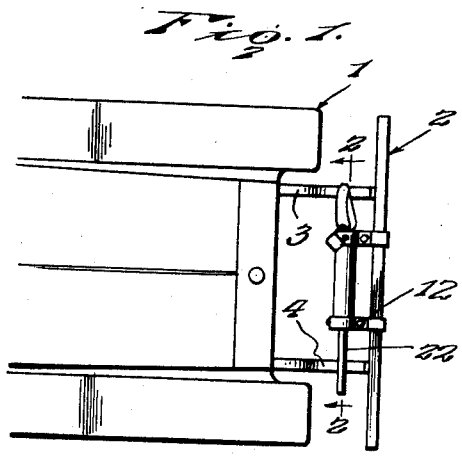
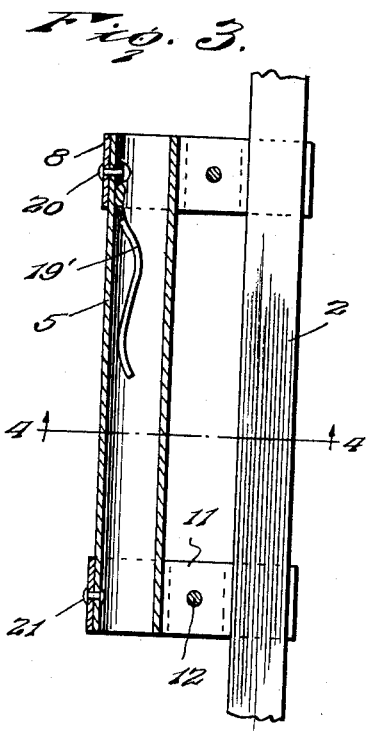
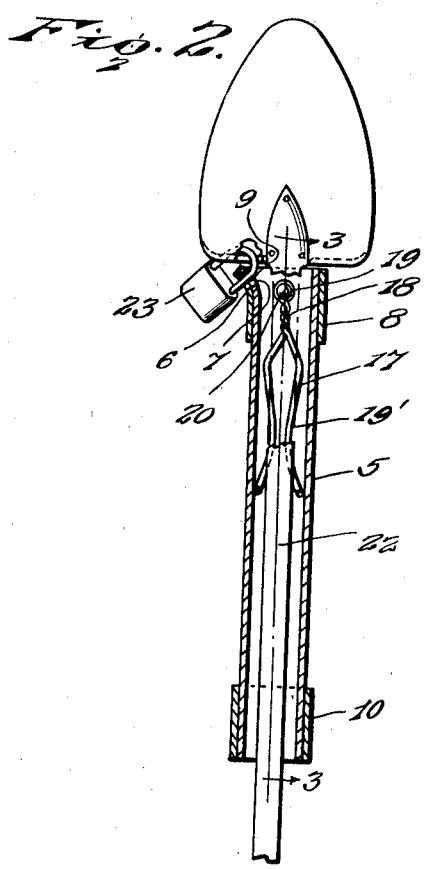
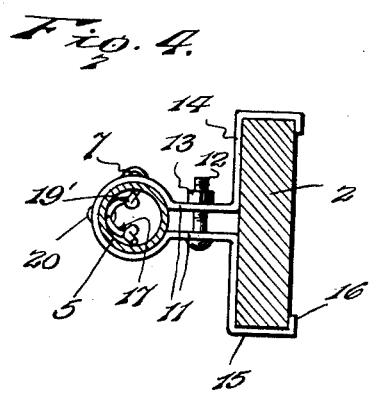
Inventor
A. P. Hartzell.
By Lacey & Lacey,
Attorneys Patented June 12, 1934

1,962,561

UNITED STATES PATENT OFFICE 1,962,561

SHOVEL HOLDER

Albert P. Hartzell, Casper, Wyo.

Application June 16, 1933, Serial No. 676,215

5 Claims. (Cl. 211—4)

This invention relates to an improved shovel holder and seeks, among other objects, to provide a device of this character which may be readily adapted to a motor vehicle and which will carry a shovel thereon in a secure position so that theft thereof will be prevented.

Another object of the invention is to provide a shovel holder wherein means are employed which will effectually prevent rattling of the shovel when in position.

A further object of the invention is to provide a shovel holder which will be characterized by the utmost simplicity and which will be capable of manufacture at a cheap figure in large quantities.

And a still further object of the invention is to provide a device of this character which, when installed, will require little or no attention so that after initial installation it will remain in proper position on the vehicle without further attention.

With these and other objects in view, the description of the invention proceeds and attention is directed to the sheet of drawings forming a part of my application, wherein Figure 1 is a top plan view of my improved device as it would appear installed on the front of a vehicle and showing a shovel in locked position therein, Figure 2 is a fragmentary enlarged longitudinal sectional view taken on the line 2—2 of Figure 1 and looking in the direction indicated by the arrows, Figure 3 is a longitudinal sectional view taken on the line 3—3 of Figure 2, and Figure 4 is a transverse sectional view taken on the line 4—4 of Figure 3.

Referring now more particularly to the accompanying drawing wherein like numerals represent like parts throughout the several views, the numeral 1 indicates a vehicle which may be either a passenger vehicle, or a truck. The vehicle is provided with a bumper 2 which is formed of a strip, or strips, of heavy metal. The bumper is supported by braces 3 which are formed with downwardly curved portions 4 immediately rearwardly of the bumper.

In carrying my invention into effect, I employ a tubular body 5 open at both ends, which body is formed of heavy metal and is if sufficient diameter to permit the ready insertion of a shovel handle. The wall of the body 5 is of sufficient thickness so that it will not be easily dented or otherwise mutilated. As best seen in Figure 2 of the drawing, the body 5 is turned outwardly at one end, as indicated by the numeral 6 and an opening 7 is formed therein.

Surrounding one end of the body 5 is a collar 8 and the collar 8 is provided with an opening 9 which is disposed in alinement with the opening 7 in the body. A collar 10 surrounds the opposite end of the body 5, said collars 8 and 10 reinforcing the opposite ends of the body 5 so that splitting of said ends will be eliminated. As best seen in Figure 4, the collars 8 and 10 are projected forwardly to define parallel portions 11 and extending through the parallel portions are bolts 12 having nuts 13 at their upper ends. The collars are further projected to provide brackets 14 and 15 which are adapted to project about the bumper 2 and effectually mount the collar and body on the bumper. The brackets are bent toward each other, as indicated by the numeral 16, so that danger of slipping of said brackets from the bumper will be eliminated. It will, therefore, be seen that, when the bolt 12 is tightened, the collar will tighten about the end of the body 5 and, simultaneously, the brackets 14 and 15 will tightly engage the bumper 2.

Carried within the body 5 and extending throughout substantially one-half its length is a preferably heavy wire spring retaining fork, which is indicated in general by the numeral 17. The retaining fork is formed from a single piece of wire which is twisted medially of its length, as indicated at 18, and is provided with a loop 19. Forwardly of the twisted portion 18 the fork is provided with diverging arms which define tines 19' which are bowed longitudinally and are turned outwardly toward the wall of the body 5, near their outer ends. A rivet 20, extending through the loop 19 and through the end portion of the body 5 and through the collar 8, effectually retains the fork in position within the body. A rivet 21, extending through the collar 10 and through the opposite ends of the collar 5, effectually connects the collar 10 with said body and cooperates with the bolt 12 for effectually retaining the collar on the body.

When a shovel is carried within the body 5, such a shovel being shown at 22 in Figures 1 and 2 of the drawing, the blade of said shovel is provided with an opening and the hasp of a padlock 23 may be passed through the opening in the blade and through the openings 7 and 9 in the body 5 and collar 8 respectively. The fork 17 will limit the handle of the shovel against rattling within the body and will also aid in limiting the shovel against removal from the body.

The device is particularly advantageous for the reason that a shovel, when in position therein, will always be disposed for ready use and yet it will not take up space, which space may be used advantageously for other purposes.

The device may be readily attached to the bumper and, after attaching, will require no further attention.

It is believed that the foregoing description will disclose that I have provided a shovel holder which will be characterized by the highest efficiency and utility.

Having thus described my invention, I claim:

1. A device of the class described including a body having an out-turned portion provided with an opening, a collar surrounding said out-turned portion and having an opening alined with said first-mentioned opening, said collar being projected to form parallel flat portions terminating in brackets, said brackets being adapted for connection with an element for supporting the device, and means carried within the body and engageable with the handle of an implement for retarding removal of the implement from the body.

2. A device of the class described including a body, collars surrounding the body at opposite ends, a fork carried within the body and having a loop, a rivet extending through the loop and locking the fork within the body, a rivet carried at the opposite end of the body and locking one of said collars to said end of said body, said collars being projected to define flat parallel portions terminating in brackets, and bolts extending through said flat parallel portions and simultaneously clamping the bracket to a supporting element and clamping the collars tightly about the end portions of the body, said fork being engageable with the handle of an implement for retaining said handle against removal from the body.

3. A device of the class described including a tubular body open at both ends, collars carried at opposite ends of the body and having flattened parallel portions terminating in brackets adapted for connection with a support, a fork carried within the body and having a twisted portion terminating in a loop, said fork being provided with diverging arms terminating in longitudinally bowed tines, said body being adapted removably to receive the handle of an implement, and means for removably connecting the implement with the body for locking said implement in the body.

4. A device of the class described including a body, a collar carried by the body and provided with a bracket, means carried by the collar and adapted for clamping the bracket on a support, said means simultaneously clamping said collar about the body, means within the body and adapted for retarding the handle of an implement from removal therefrom, and means extending through the collar and body and securing said implement-engaging means in position.

5. A device of the class described including a body, collars carried at opposite ends of the body and having brackets adapted for connection with a support, and resilient means within the body and adapted for retarding the movement of the handle of an implement within the body, said means being formed of a single strand of wire defining tines for engaging the handle of said implement.

ALBERT P. HARTZELL. [L. S.]